Aug. 14, 1928.
W. E. HART
AUTOMOBILE BUMPER
Original Filed Oct. 7, 1927
1,680,879
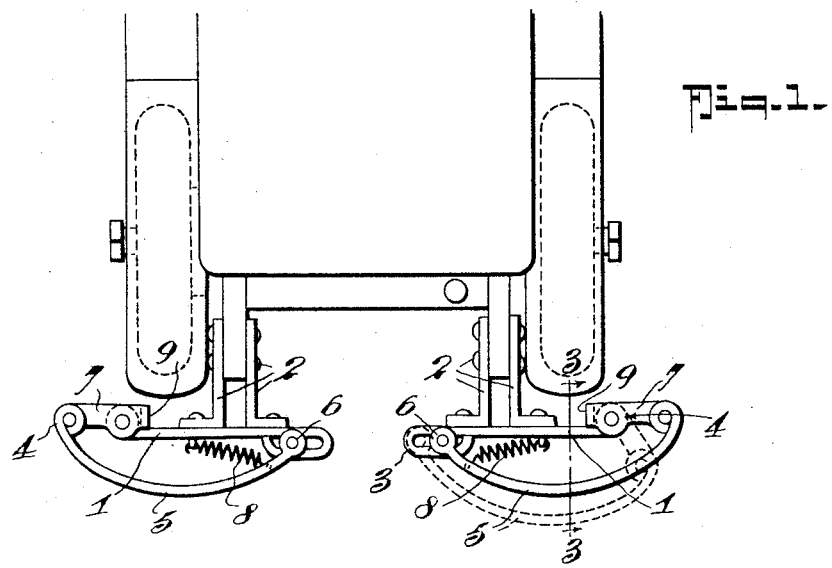
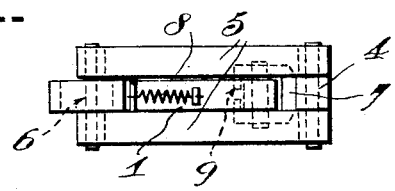
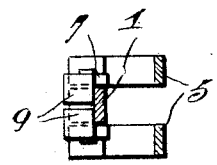
INVENTOR
*William E. Hart.*
BY
*Albert E. Dieterich*
ATTORNEY Patented Aug. 14, 1928.

1,680,879

UNITED STATES PATENT OFFICE.

WILLIAM E. HART, OF SAN JOSE, CALIFORNIA.

AUTOMOBILE BUMPER.

Original application filed October 7, 1927, Serial No. 224,662. Patent No. 1,670,963, dated May 22, 1928. Divided and this application filed March 24, 1928. Serial No. 264,382.

The invention generally relates to bumpers designed to protect vehicles against damage in collision, and more particularly to that type of such bumpers which provide for yieldably resisting obstructions when engaged in certain directions and to freely yield to obstructions engaged in other directions to prevent interlocking with said obstructions and breakage of said bumpers.

In its more detailed nature the invention resides in the provision of a novel bumper structure of the particular type stated which comprises a modification of the generic structure disclosed in my Patent No. 1,670,963, granted May 22, 1928, on application filed October 7, 1927, Serial No. 224,662 of which parent application this present application forms a division.

With the above and other objects in view, the invention further resides in the novel details of construction, combination and arrangement of parts, all of which will be first fully described in the following detailed description, then be particularly pointed out in the appended claims, reference being had to the accompanying drawing, in which:—

Figure 1 is a somewhat diagrammatic plan view of the rear end of a vehicle with my improved bumper mounted thereon.

Figure 2 is a face view of the bumper.

Figure 3 is a vertical cross section taken on the line 3—3 of Figure 1.

In the practical development of my invention I provide a main bumper bar 1 which is secured as at 2 to the rear chassis projection and is bent at one end as at 3 to form a slot loop and at its other end as at 4 to form a hinge eye. A yieldable bumper member 5 is provided and is pin connected as at 6 at one of its ends in the slot 3 and hinged-link-connected as at 7 at its other or outer end to the main bar hinge eye 4, a spring 8 being connected to the said members 1 and 5 to hold them to their normal positions illustrated in full lines in Figure 1 but yieldably against obstructions from the outside in the manner indicated by dotted lines in the said figure.

The hinge link 7 is provided with abutment lugs 9 which engage the rigid bumper bar 1 and limit movement of the parts in the inward direction beyond the normal position illustrated in full lines in Figure 1.

In use the bowed resilient bumper bar 5 will efficiently absorb shocks due to collision from the rearward direction, the pin and slot connections 6 permitting the end extension movement or straightening out of the said bar incident to such shock absorbing action and the lugs 9 serving to constitute the other connection of the said bar a relatively fixed or rigid connection. However, when the hinged-link-connected end of the bar 5 is engaged from the inward direction such as would ordinarily cause an interlocking or breakage of bumpers the said bumper bar is free to retract or yield to the position indicated in dotted lines in Figure 1 to prevent such interlocking or breakage of the bumper.

What I claim is:

1. In bumpers, a rigid bumper bar having a slot loop at one end and a hinge eye at its other end, means to mount the bar on a support, a yieldable bumper member pin connected at one end in the slot loop and a hinge link connected at its other end to the hinge eye, said hinge link having an abutment lug to engage the rigid bar and limit hinge action in one direction, and a spring to hold the parts to normal position with the abutment lug in engagement with the bumper bar.

2. In bumpers, opposed individual bumper members, means to rigidly mount one member on a vehicle, means to pin-and-slot connect the bumper members at one end to permit slide movement of one on the other at the one end, means to hinge link the bumper members together at the other end to provide an end extension, and means to limit hinge link movement in one direction for the purpose described.

3. In bumpers, opposed individual bumper members, means to rigidly mount one member on a vehicle, means to pin-and-slot connect the bumper members at one end to permit slide movement of one or the other at the one end, means to hinge link the bumper members together at the other end to provide an end extension, a spring connected between the opposed bumper members to normally hold the hinge link extended end to its extended limit, and means to limit hinge link movement in one direction for the purpose described.

WILLIAM E. HART.